(12) United States Patent
Sites

(10) Patent No.: US 9,690,714 B1
(45) Date of Patent: Jun. 27, 2017

(54) MULTIPLE PAGE-SIZE TRANSLATION LOOKASIDE BUFFER

(71) Applicant: Google Inc., Mountain View, CA (US)

(72) Inventor: Richard L. Sites, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 53 days.

(21) Appl. No.: 14/246,439

(22) Filed: Apr. 7, 2014

(51) Int. Cl.
*G06F 12/10* (2016.01)
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/65* (2013.01); *G06F 2212/652* (2013.01); *G06F 2212/68* (2013.01)

(58) Field of Classification Search
CPC .. G06F 12/10; G06F 12/1009; G06F 12/1027; G06F 12/1036; G06F 12/0292; G06F 12/04; G06F 2212/50; G06F 2212/502; G06F 2212/68
See application file for complete search history.

(56) References Cited

U.S. PATENT DOCUMENTS 5,752,275 A * 5/1998 Hammond .................. 711/207
6,336,180 B1 * 1/2002 Long et al. ................... 712/34
2006/0277390 A1 * 12/2006 Zuraski et al. ............... 711/207
2009/0024824 A1 * 1/2009 Stecher ........................ 711/206
2011/0219208 A1 * 9/2011 Asaad et al. .................. 712/12

OTHER PUBLICATIONS

Andy Glew's comp-arch.net wiki, http://semipublic.comp-arch.net, "Multiple Virtual Memory Page Sizes," CompArch, published on or before Oct. 17, 2011, 5 pages.
Seznec, "Concurrent Support of Multiple Page Sizes on a Skewed Associative TLB," Computers, IEEE Transactions on, 53(7):924-927, Jul. 2004.

* cited by examiner

*Primary Examiner* — Arpan P. Savla
*Assistant Examiner* — William E Baughman
(74) *Attorney, Agent, or Firm* — Fish & Richardson P.C.

(57) ABSTRACT

An example method includes receiving a request to change a page size managed by a translation lookaside buffer (TLB), wherein the TLB is currently managing a first page size, and the request specifies a second page size different than the first page size; in response to the request: determining a number of lower-order bits for addressing memory location within pages of the second page size; and configuring the TLB to perform lookups within the memory subsystem using a number of higher-order bits for addressing pages of the second page size, wherein the number of higher-order bits is dependent on the number of lower-order bits.

14 Claims, 5 Drawing Sheets

MULTIPLE PAGE-SIZE TRANSLATION LOOKASIDE BUFFER

BACKGROUND

This specification relates to techniques for providing a translation lookaside buffer configurable to support different memory page sizes.

Translation lookaside buffers (TLBs) are specialized cache structures for optimizing the translation of virtual memory addresses to physical memory addresses in systems using segmented or virtual memory. In such systems, each process addresses its memory space using virtual addresses, which are separate from the physical addresses of the actual memory locations storing the process data. The mapping from virtual addresses to physical addresses is stored in a page table. A TLB stores frequently used virtual address to physical address mappings to avoid having to access the page table for each address translation in order to improve memory performance.

SUMMARY

The subject matter of this application relates to techniques for providing a translation lookaside buffer configurable to support different memory page sizes.

In general, one innovative aspect of the subject matter described in this specification can be embodied in methods that include the actions of receiving a request to change a page size managed by a translation lookaside buffer (TLB), wherein the TLB is currently managing a first page size, and the request specifies a second page size different than the first page size; in response to the request: determining a number of lower-order bits for addressing memory locations within pages of the second page size; and configuring the TLB to perform lookups using a number of higher-order bits for addressing pages of the second page size, wherein the number of higher-order bits is dependent on the number of lower-order bits.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By allowing TLBs to be configured for different page sizes, a particular application may use all TLB resources of a particular system, rather than only those specially designed to handle the particular page size of the particular application. Further, a system may reconfigure its various TLBs on-the-fly as application needs change (e.g., with every context switch), thereby leading to increased performance. Further still, existing software such as operating systems may be run with a small 4 kilobyte (KB) page size while newer software may take advantage of larger memories using larger page sizes.

For example, consider a system including a 128-entry 4 KB-page TLB, a 32-entry 2 megabyte (MB)-page TLB, and a 4-entry 1 gigabyte (1 GB)-page TLB. In such a configuration, an application having a 1 GB page size may have increased TLB misses, and therefore decreased performance, versus 4 KB page size application, due to the 4 KB-page TLB having more entries (128) than the 1 GB-page TLB (4). Such a configuration effectively discourages use of very large pages, causing new software to use 4 KB pages for which 128 TLB entries can only address a total of 512 KB of main memory without taking a TLB miss. Many modern systems include 128 GB or more of main memory, meaning the 4 entry 1 GB-page TLB is not large enough to store enough entries to address all or a even a large portion of such memory. Changing to allow 128 entries of 1 GB each plus 4 entries of 4 KB may allow applications with such large page sizes to address all or a large fraction of main memory without TLB misses, while allowing applications and operating systems using 4 KB pages to run although with a higher TLB miss rate in the 4 entry TLB. In addition, by allowing the page sizes of each TLB to be changed programmatically, the system can effectively be customized to handle the page size requirements of different applications, leading to greater TLB efficiency and greater overall system performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
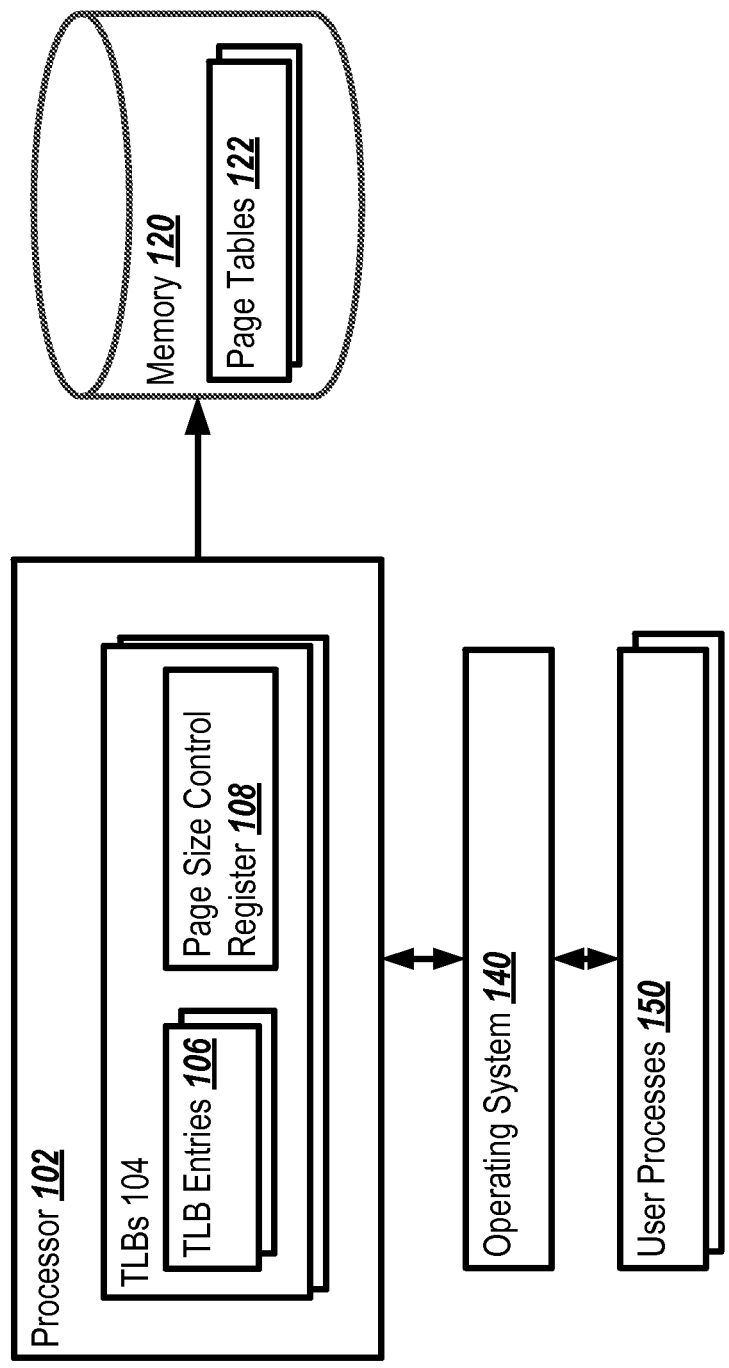
FIG. 1 is a block diagram of an environment in which translation lookaside buffer configurable to support different memory page sizes can be implemented.

The present disclosure relates to providing a translation lookaside buffer configurable to support different memory page sizes.

Translation lookaside buffers (TLBs) are special purpose caches used in virtual address translation. A TLB stores mappings from virtual memory addresses to physical memory addresses by caching entries from a page table. When a program needs to access a memory location, it will reference the location using a virtual address associated with its virtual memory space. The memory subsystem consults the TLB to determine if it stores a mapping for the particular virtual address. If so, the memory subsystem proceeds with the memory operation using the corresponding physical memory address from the TLB. If no entry exists in the TLB for the virtual address, the memory subsystem must consult the page table. Because memory access is frequent and page table lookups are (relatively) time consuming, a high TLB hit rate may result in increased memory subsystem performance. TLBs may support set associative lookups, such that multiple locations within the TLB are accessed in a single operation. For example, a four-way associative TLB accesses four TLB locations at once, while a fully associative TLB accesses all TLB locations at once.

TLB entries generally only map a certain number of bits from a virtual address to a corresponding number of bits in a physical address. The number of bits mapped is a function of the page size associated with the virtual address. For example, for a 4 KB page size, the first 12 bits of the physical address represent an offset within a page, because 12 bits are sufficient to address every memory location within a 4 KB page. In a TLB storing 4 KB page size entries, these first 12 bits are ignored during a lookup, and only higher order bits are used. In a system using 64 bit addressing, the remaining 52 bits of the address would be used in a TLB storing 4 KB page size entries. In another example, for a 1 GB page size, the first 30 bits of the physical address represent an offset within a page, and the remaining 34 bits would be used in a TLB storing 1 GB page size entries.

Different types of applications may have different memory page sizes. For example, an application that performs many small sequential reads from memory may be configured to use a small page size (e.g., 4 KB) for performance reasons, as larger page sizes may result in poor performance due to frequent cache misses and swapping. An application that performs many large sequential reads from memory may be configured to use a large page size (e.g., 1 GB) in order to improve caching performance.

Because TLBs are generally designed for low latency due to the frequency at which TLB lookups are performed, a single TLB will generally be designed to handle entries for one page size, and thus be designed to use a certain number of bits from a physical address when performing a lookup. Some systems may include multiple separate TLBs, each dedicated to storing entries for different page sizes. Such a configuration is inflexible, and may lead to TLB misses in systems running applications with different page sizes.

The present disclosure relates to techniques for allowing dynamic configuration of the page size for a TLB "on-the-fly," e.g., as part of a program execution. One example method includes identifying a request to change a page size for a TLB, where the request specifies a new page size for the TLB. A number of significant bits for physical addresses associated with the new page size is determined, and the TLB is configured to perform lookups using the number of significant bits for physical addresses associated with the new page size. In some cases, the request may be identified by identifying a new value of a control register. For example, an operating system may perform a context switch from an application using one page size to an application using a different page size, and may reconfigure the TLB to use the different page size upon performing the context switch by writing an appropriate value to the control register associated with the TLB.

FIG. 1 is a block diagram of an environment 100 in which translation lookaside buffer configurable to support different memory page sizes can be implemented. As shown, environment 100 includes a processor 102 coupled to a memory 120. An operating system 140 executes on and interacts with the processor 102. The operating system 140 manages one or more user processes 150. The processor 102 includes one or more translation lookaside buffers (TLBs) 104 including one or more TLB entries 106 and a page size control register 108. In operation, the operating system 140 and/or the one or more user processes 150 may adjust the value of the page size control register 108 to configure the TLB 104 to handle entries associated with different page sizes. For example, if the operating system 140 performs a context switch from a user process 150 with a first page size to a user process 150 with a second, different page size, the operating system 140 may change the value of the page size control register 108 for the TLB 104 to a value corresponding to the second page size. In response, the TLB 104 may be reconfigured to perform lookups according to the second page size. In some cases, the TLB 104 may be configured to use a particular number of high order bits from an input address to perform a lookup, and to pass a particular number of low order bits from the input address straight to the output. This process is described in greater detail with respect to FIGS. 2-4.

The environment 100 includes a processor 102. In some implementations, the processor 102 may be a general-purpose central processing unit (CPU) included a computer system. The processor 102 may also be a special purpose or embedded processor, or a special-purpose controller for a particular system or subsystem. Although a single processor 102 shown in FIG. 1, in some implementations, two or more processors 102 may be included. In some implementations, the processor 102 may be an x86 compatible processor, such as those manufactured by INTEL, AMD, or other manufacturers. The processor 102 may operate in different operating modes, including, but not limited to, real mode, virtual x86 mode, 16-bit mode, 32-bit mode, compatibility mode, long mode, and 64-bit mode. The processor 102 may also be another type of processor, including, but not limited to, ARM, QUALCOMM SNAPDRAGON, IBM POWER, XILINX MICROBLAZE, or other types of processors that include a TLB.

In some implementations, the processor 102 may include one or more processor cores (not shown), each capable of executing one or more threads of execution. The processor cores may execute these threads simultaneously with one another. In some implementations, the processor 102, the processor cores, or both components may include integrated storage for caching data. The processor 102 or the processor cores may also include microcode including instructions defining the behavior of the components.

The processor 102 includes one or more TLBs 104. In operation, each TLB 104 stores translations from virtual memory addresses to physical memory addresses in one or more TLB entries 106. In some implementations, each TLB 104 may be a multi-way associative or fully associative structure operable to perform lookup operations on multiple TLB entries 106 within it simultaneously. In some cases, the TLB 104 may be a content addressable memory (CAM). In some implementations, each TLB 104 may be associated with a particular processor core, or the TLBs 104 may be shared across all processor cores associated with the processor 102. The TLB 104 may also be included in components separate from the processor 102, such as, for example, a dedicated memory controller. Operation of the TLB 104 is explained in greater detail with respect to FIGS. 2-4.

Each TLB 104 includes a page size control register 108. In operation, the value in the page size control register 108 controls the page size the TLB 104 is configured to handle. In some implementations, the value in the page size control register 108 may be an integer value corresponding to the selected page size. For example, inserting a value of "1" into the page size control register 108 may configure the TLB 104 for a 4 KB page size, and inserting a value of "2" into the page size control register 108 may configure the TLB 104 for a 32 MB page size, and so on. In other implementations, the value inserted into the page size control register 108 may specify a number of bits to include in a TLB lookup, such as, for example, using a bit mask, using an integer representation of the number of bits, or in other ways. For example, inserting a value of "0xFFF" (12 bits set to 1) into the page size control register 108 may configure the TLB 104 for a 4 KB page size by indicating the first 12 bits of any address are to be passed directly to the output (as described in FIGS. 2-4). In some implementations, the page size control register 108 may only accept updates at certain times, such as, for example, after a certain number of clock cycles, to avoid performing the relatively expensive process of reconfiguring the TLB 104 frequently. In some cases, the TLB 104 may be cleared in response to a change in the value of the page size control register 108, such as, for example, by clearing the TLB entries 106.

The environment 100 also includes a memory 120 or multiple memories 120. The memory 120 may include any type of memory or database module and may take the form of volatile and/or non-volatile memory including, without limitation, magnetic media, optical media, random access memory (RAM), read-only memory (ROM), removable media, or any other suitable local or remote memory component. The memory 120 may also include cache memory integrated into the processor 102 or processor cores. As shown, the memory 120 includes one or more page tables 122 storing mappings from virtual memory addresses to physical memory addresses. As described previously, when a virtual memory address to physical memory address translation cannot be performed using the TLBs 104, the translation must be performed by the page tables 122, which can be relatively time-consuming and negatively affect system performance.

Environment 100 also includes an operating system 140. In operation, the operating system 140 executes on the processor 102, and directs the processor 102 to execute the one or more user processes 150. In some implementations, the operating system 140 may configure the TLBs 104 to handle a page size specified for a particular user process 150 prior to executing the particular user process 150 on the processor 102. In some cases, the operative system 140 may accomplish this by changing the page size control register 108 when it performs a context switch to the particular user process 150. In some implementations, the particular user process 150 may itself reconfigure the TLB 104 by adjusting the value in the page size control register 108, while in other cases such an operation may be restricted or prohibited. In some implementations, the operating system 140 may be a commercial or open source operating system executing on the processor 102. In some implementations, the operating system may be GOOGLE ANDROID, GOOGLE CHROMEOS, or other operating systems.

Figure 2:
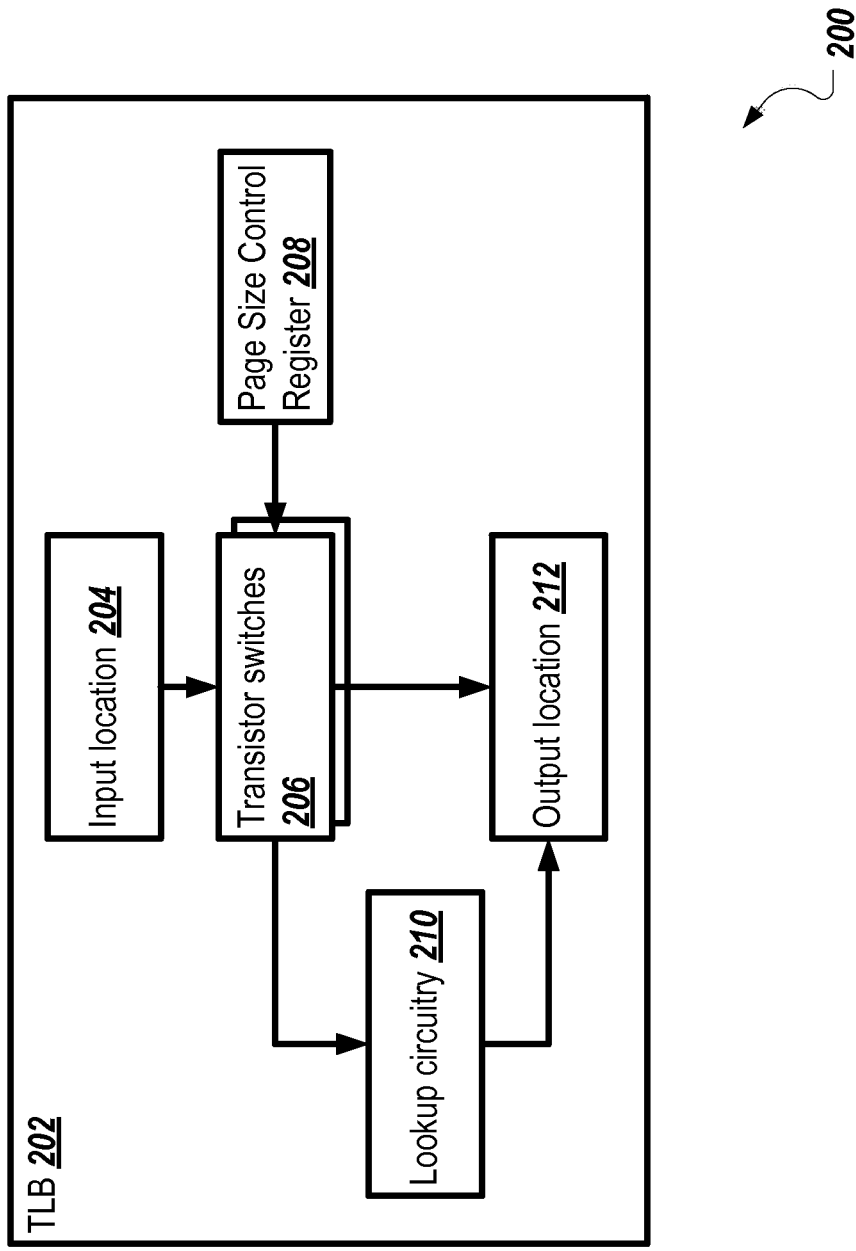
FIG. 2 is a block diagram of an example system showing the interaction between components of an example translation lookaside buffer according to the present disclosure.

FIG. 2 is a block diagram of an example system 200 showing the interaction between components of an example TLB 202 according to the present disclosure. As shown, the TLB 202 includes an input location 204, one or more transistor switches 206, a page size control register 208, lookup circuitry 210, and an output location 212. In operation, the transistor switches 206 are set, e.g., their states are configured, according to the value of the page size control register 208. The TLB 202 receives a virtual memory address at the input location 204. The states of the transistor switches 206 are configured such that the low order offset bits associated with the selected page size are directly connected to the output location 212, and such that the high order page identifier bits are directed to lookup circuitry 210. The high order bits of the virtual memory address are used to produce the corresponding high order bits of the physical memory address from the lookup circuitry 210. The higher bits are output from the lookup circuitry 210 to the output location 212 to form the full physical memory address associated with the virtual memory address.

The input location 204 may be a register or other location into which the virtual memory address may be passed to the TLB 202 for translation. The output location 212 may be a register other location that will contain the physical memory address corresponding to the virtual memory address once the lookup is complete. In some implementations, the output location 212 may be populated with the specific value in cases where the virtual memory address cannot be translated based on the contents of the TLB 202. The lookup circuitry 210 may include an array of stores locations storing virtual memory address to physical memory address translations, and may be organized according to any suitable scheme. In some implementations, lookup circuitry 210 may be a content addressable memory (CAM). Lookup circuitry 210 may also be multiway associative or fully associative.

Transistor switches 206 may be an array of transistor switches to organize such that each switch corresponds to one bit of the input location 204. In such an implementation, closing a particular switch may connect the corresponding bit to the output location 212, such that the corresponding bit will not be used when performing a lookup. In some implementations, other structures may be used in place or in addition to the transistor switches 206, such as, for example, relays, gates, or other structures.

Figure 3:
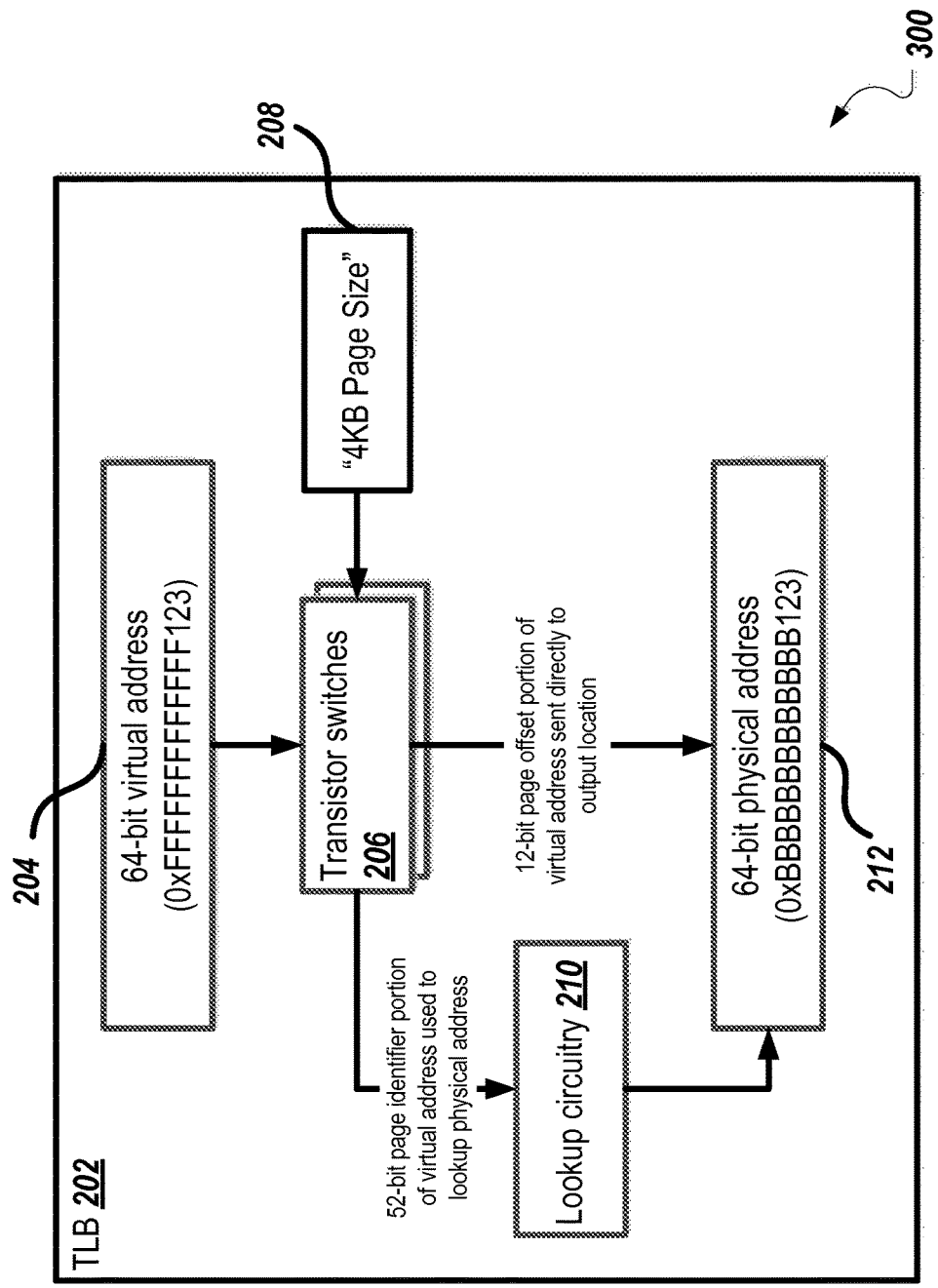
FIG. 3 is a block diagram of an example system showing the interaction between components of the example translation lookaside buffer when configured for a particular page size.

FIG. 3 is a block diagram of an example system 300 showing the interaction between components of the example TLB 202 when configured for a particular page size. As shown, the page size control register 208 is populated with a value corresponding to a 4 KB page size. In response to this value being present in the page size control register 208, the transistor switches 206 are configured to pass the first 12 bits of the input location 204 directly to the output location 212, such as, for example, by closing the switches corresponding to these bits. As shown, the input location 204 is populated with a 64-bit virtual address (0xFFFFFFFFFFFFF123). The first 12 bits of the virtual address (0x123) are passed directly to the output location 212, and are included in the physical address shown in the output location 212. The remaining 52 bits of the virtual address are passed to the lookup circuitry 210 and used to retrieve the corresponding bits of an associated physical address (0xBBBBBBBBBBBBB). The 52 and 12 bit portions combine at the application 212 to form the full 64-bit physical address corresponding to the 64-bit virtual address (0xBBBBBBBBBBBBB123).

Figure 4:
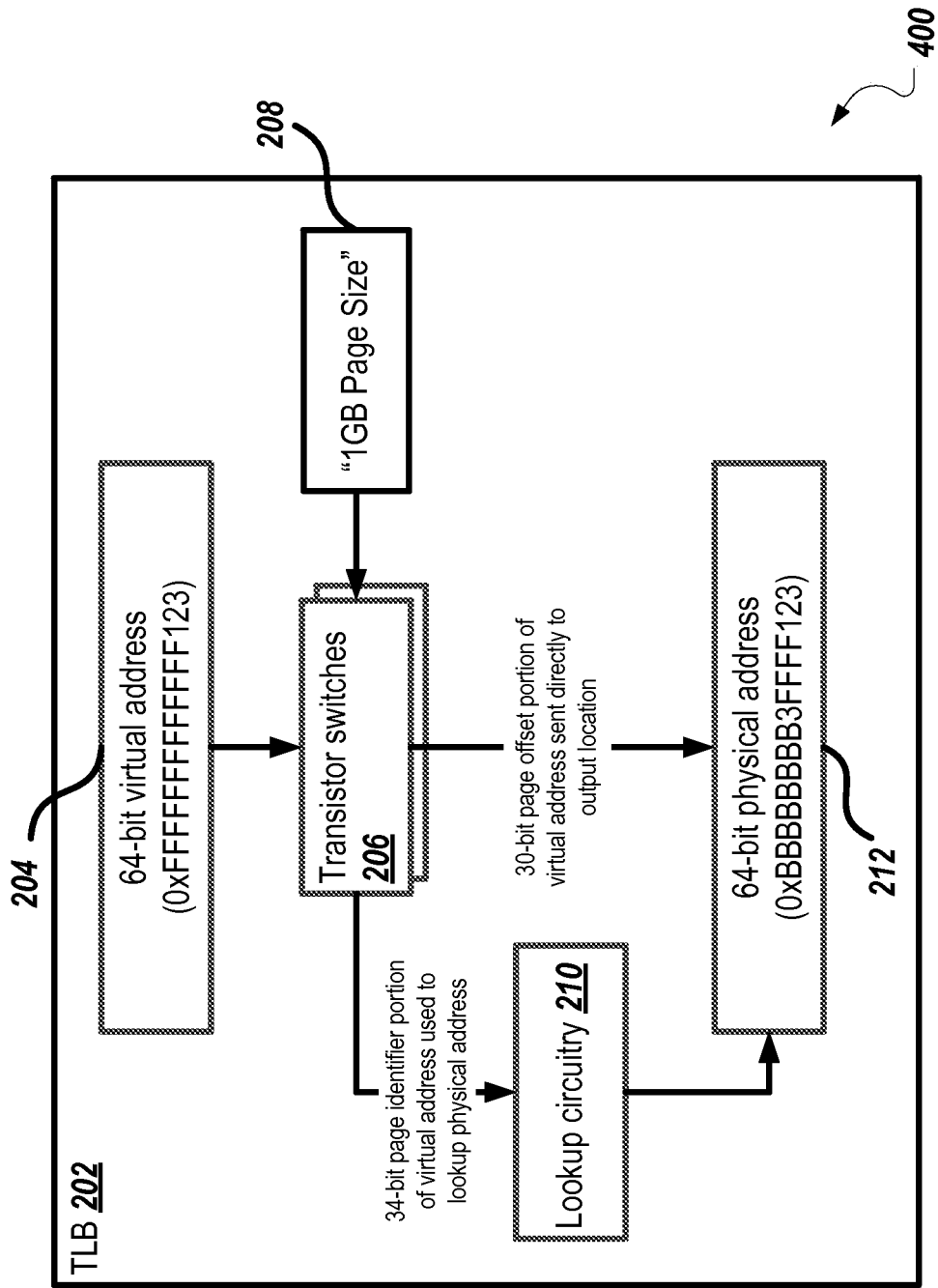
FIG. 4 is a block diagram of an example system showing the interaction between components of the example translation lookaside buffer when configured for a different page size.

FIG. 4 is a block diagram of an example system 400 showing the interaction between components of the example TLB 202 when configured for a different page size. As shown, the page size control register 208 is populated with a value corresponding to a 1 GB page size. In response to this value being present in the page size control register 208, the transistor switches 206 are configured to pass the first 30 bits of the input location 204 directly to the output location 212, such as, for example, by closing the switches corresponding to these bits. As shown, the input location 204 is populated with a 64-bit virtual address (0xFFFFFFFFFFFFF123). The first 30 bits of the virtual address (0x3FFFF123) are passed directly to the output location 212, and are included in the physical address shown in the output location 212. The remaining 34 bits of the virtual address are passed to the lookup circuitry 210 and used to retrieve the corresponding bits of an associated physical address (0xBBBBBBBBBBBB0). The 34 and 30 bit portions combine at the application 212 to form the full 64-bit physical address corresponding to the 64-bit virtual address (0xBBBBBBBBB3FFFF123).

Figure 5:
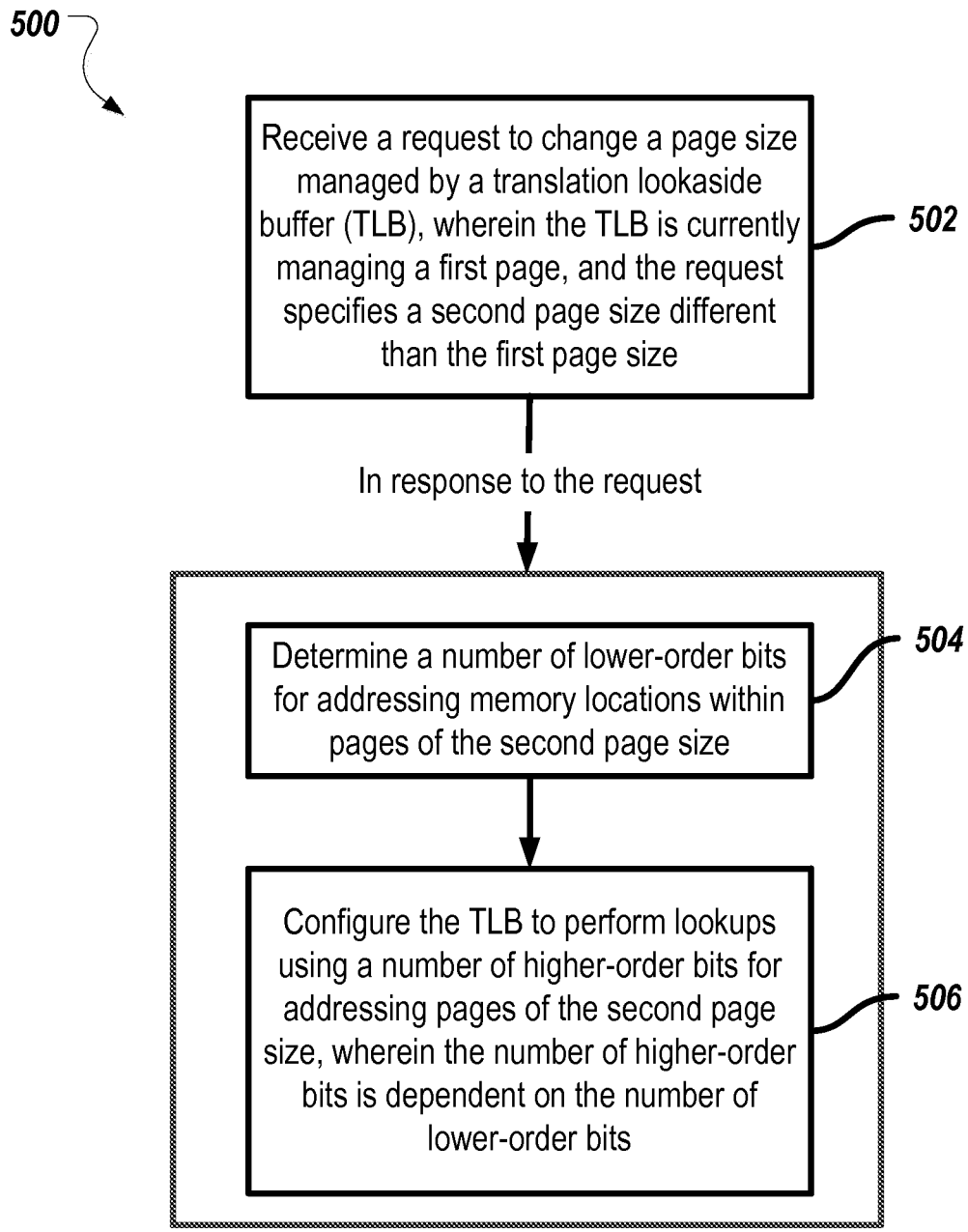
FIG. 5 is a flow diagram of an example process for providing a translation lookaside buffer configurable to support different memory page sizes.

FIG. 5 is a flow diagram of an example process for providing a translation lookaside buffer configurable to support different memory page sizes. At 502, a request is received to change a page size managed by a TLB, wherein the TLB is currently managing a first page, and the request specify the second page size different than the first page size. In some cases, identifying the request to change the page size managed by the TLB includes identifying a value for a control register, where the value of the control register corresponding to the second page size. In some implementations, the value of the control register is a bit mask representing the number of lower-order bits for addressing memory location within pages of the second page size, and determining the number of the number of lower-order bits includes analyzing the bit mask.

In response to the request, at 504, a number of lower order bits are determined for addressing memory locations within pages of the second page size. Also in response to the request, at 506, the TLB is configured to perform lookups using a number of higher order bits for addressing pages of the second page size, wherein the number of higher order bits is dependent on the number of lower border bits. In some cases, configuring the TLB includes updating one or more transistor switches associated with the TLB to connect input locations associated with the higher-order bits to TLB lookup circuitry. Configuring the TLB may also include updating the one or more transistor switches associated with the TLB to connect input locations associated with the lower-order bits to corresponding output locations.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a transmission link for receipt by the second device, but may not include the second device receiving the data. Conversely, "receiving" from a first device may include receiving the data from a transmission link, but may not include the first device transmitting the data.

"Determining" by a computing system can include the computing system requesting that another device perform the determination and supply the results to the computing system.

Embodiments of the subject matter and the operations described in this specification can be implemented in digital electronic circuitry, or in computer software, firmware, or hardware, including the structures disclosed in this specification and their structural equivalents, or in combinations of one or more of them.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and optical disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A translation lookaside buffer (TLB) comprising:
a memory subsystem;
a controller configured to perform operations comprising:
receiving a request to change a page size managed by the TLB, wherein the TLB is currently managing a first page size associated with a first executed application, and the request specifies a second page size associated with a second executed application, the second page size being different than the first page size;
in response to the request, reconfiguring the TLB to use the second page size by:
determining a number of lower-order bits for addressing memory location within pages of the second page size; and
configuring the TLB to perform lookups within the memory subsystem using a number of higher-order bits for addressing pages of the second page size, wherein the number of higher-order bits is dependent on the number of lower-order bits,
wherein configuring the TLB comprises configuring the state of multiple transistor switches for the TLB to a first state or a second state, wherein one or more of the transistor switches are configured in the first state to connect input locations for the higher-order bits to TLB lookup circuitry and one or more of the transistor switches are configured in the second state to connect input locations for the lower-order bits to corresponding output locations without being passed to the TLB lookup circuitry.

2. The translation lookaside buffer of claim 1, wherein receiving the request to change the page size managed by the TLB includes determining a value of a control register has changed to a particular value corresponding to the second page size, wherein the value of the control register corresponds to the page size the TLB is configured to manage.

3. The translation lookaside buffer of claim 2, wherein the value of the control register is a bit mask representing the number of lower-order bits for addressing memory location within pages of the second page size, and the number of lower-order bits is determined at least in part based on which bits are set in the bit mask.

4. The translation lookaside buffer of claim 1, the operations further comprising clearing the TLB in response to the request to change the page size.

5. The translation lookaside buffer of claim 1, wherein the second page size is 1 gigabyte and the number of lower-order bits for addressing memory locations within pages of the second page size is 30.

6. A computer-implemented method executed by one or more processors, the method comprising:
receiving a request to change a page size managed by a translation lookaside buffer (TLB), wherein the TLB is currently managing a first page size associated with a first executed application, and the request specifies a second page size associated with a second executed application, the second page size being different than the first page size;
in response to the request, reconfiguring the TLB to use the second page size by:
determining a number of lower-order bits for addressing memory locations within pages of the second page size; and
configuring the TLB to perform lookups within the memory subsystem using a number of higher-order bits for addressing pages of the second page size, wherein the number of higher-order bits is dependent on the number of lower-order bits,
wherein configuring the TLB comprises configuring the state of multiple transistor switches for the TLB to a first state or a second state, wherein one or more of the transistor switches are configured in the first state to connect input locations for the higher-order bits to TLB lookup circuitry and one or more of the transistor switches are configured in the second state to connect input locations for the lower-order bits to corresponding output locations without being passed to the TLB lookup circuitry.

7. The method of claim 6, wherein receiving the request to change the page size managed by the TLB includes determining a value of a control register has changed to a particular value corresponding to the second page size, wherein the value of the control register corresponds to the page size the TLB is configured to manage.

8. The method of claim 7, wherein the value of the control register is a bit mask representing the number of lower-order bits for addressing memory location within pages of the second page size, and the number of lower-order bits is determined at least in part based on which bits are set in the bit mask.

9. The method of claim 6, further comprising clearing the TLB in response to the request to change the page size.

10. The method of claim 6, wherein the second page size is 1 gigabyte and the number of lower-order bits for addressing memory locations within pages of the second page size is 30.

11. A non-transitory, computer-readable medium storing instructions operable when executed to cause at least one processor to perform operations comprising:
receiving a request to change a page size managed by a translation lookaside buffer (TLB), wherein the TLB is currently managing a first page size associated with a first executed application, and the request specifies a second page size associated with a second executed application, the second page size being different than the first page size;

in response to the request, reconfiguring the TLB to use the second page size by:

determining a number of lower-order bits for addressing memory location within pages of the second page size; and configuring the TLB to perform lookups within the memory subsystem using a number of higher-order bits for addressing pages of the second page size, wherein the number of higher-order bits is dependent on the number of lower-order bits, wherein configuring the TLB comprises configuring the state of multiple transistor switches for the TLB to a first state or a second state, wherein one or more of the transistor switches are configured in the first state to connect input locations for the higher-order bits to TLB lookup circuitry and one or more of the transistor switches are configured in the second state to connect input locations for the lower-order bits to corresponding output locations without being passed to the TLB lookup circuitry.

12. The computer-readable medium of claim 11, wherein receiving the request to change the page size managed by the TLB includes determining a value of a control register has changed to a particular value corresponding to the second page size, wherein the value of the control register corresponds to the page size the TLB is configured to manage.

13. The computer-readable medium of claim 12, wherein the value of the control register is a bit mask representing the number of lower-order bits for addressing memory location within pages of the second page size, and the number of lower-order bits is determined at least in part based on which bits are set in the bit mask.

14. The computer-readable medium of claim 11, the operations further comprising clearing the TLB in response to the request to change the page size.

* * * * *